United States Patent [19]

Takayama et al.

[11] Patent Number: 4,923,765
[45] Date of Patent: May 8, 1990

[54] MAGNETO-OPTICAL RECORDING MEDIUM

[75] Inventors: Shinji Takayama, Mitaka; Toshio Niihara, Hachioji; Katsuhiro Kaneko, Sayama; Yutaka Sugita, Tokorozawa, all of Japan

[73] Assignee: Hitachi, Ltd., Tokyo, Japan

[21] Appl. No.: 294,941

[22] Filed: Jan. 6, 1989

Related U.S. Application Data

[63] Continuation of Ser. No. 85,716, Aug. 17, 1987, abandoned, which is a continuation of Ser. No. 786,498, Oct. 11, 1985, abandoned.

[30] Foreign Application Priority Data

Oct. 11, 1984 [JP] Japan .................................. 59-211320
Oct. 11, 1984 [JP] Japan .................................. 59-211321
Oct. 19, 1984 [JP] Japan .................................. 59-218303
Mar. 20, 1985 [JP] Japan .................................. 60-54421

[51] Int. Cl.$^5$ .............................................. G11B 7/24
[52] U.S. Cl. ................................... 428/694; 365/122; 369/13; 369/288; 428/681; 428/900
[58] Field of Search ................. 428/694, 900, 606; 365/122; 369/13, 288

[56] References Cited

U.S. PATENT DOCUMENTS 4,438,508 3/1984 Urner-Willie et al. ............... 365/122
4,518,657 5/1985 Yanagida ............................... 428/450
4,670,353 6/1987 Sakurai .................................. 428/606

FOREIGN PATENT DOCUMENTS 73746 5/1983 Japan .
2077065 12/1981 United Kingdom .

OTHER PUBLICATIONS

"Aging Effects on Amorphous Tb-Transition-Metal Film . . . ", J. Appl. Physics, 57(1), Apr. 15, 1985, p. 3900.

Primary Examiner—Paul J. Thibodeau
Attorney, Agent, or Firm—Antonelli, Terry & Wands

[57] ABSTRACT

A magneto-optical recording medium made of a rare-earth-transition metal amorphous film provides a compensation temperature Tcomp of 50°–200° C. or 0° C. or less. This compensation temperature decreases a saturation magnetization Ms during recording, thereby preventing the provision of inverted magnetic domains at the centers of recording domains resulting from the demagnetizing field generated by the strength distribution of laser light, and so improving a carrier-to-noise ratio during reading. In the case of using a Tb-Fe-Co system amorphous film, Tcomp of 50°–200° C. may be give by the composition comprising Tb of 24–30 atomic %, Co of 7–20 atomic % and Fe of the rest, and Tcomp of 0° C. or less may be given by the composition comprising Tb of 18–21.5 atomic %, Co of 8–10 atomic % and Fe of the rest.

6 Claims, 5 Drawing Sheets

MAGNETO-OPTICAL RECORDING MEDIUM

This application is a continuation of application Ser. No. 07/085,716, filed August 17, 1987, which was a continuation of application Ser. No. 06/786,498, filed October 11, 1985 both now abandoned.

CROSS REFERENCE TO OTHER APPLICATIONS

This application is related to U.S. patent application Ser. No. 659,681 filed on October 11, 1984 by the same inventors as this application claiming priority based on the Japanese Patent Application No. 58-190,741 filed on October 14, 1983.

BACKGROUND OF THE INVENTION

This invention relates to a magneto-optical recording medium for recording, reading and erasing information by using laser light, and more particularly to a magneto-optical recording medium having a high recording sensitivity, suited to improving a carrier-to-noise ratio (C/N) and having a large magneto-optical effect.

In recent years, as a medium for magneto-optical recording, rewritable optical system, rare-earth-transition metal amorphous thin films which provide a relatively larger Kerr rotation angle have been particularly noted. Among these amorphous thin films, particularly a Gd-Tb-Fe or Tb-Fe-Co system amorphous thin film provides a comparatively larger Kerr rotation angle so that reserch and development on this alloy system have been actively carried out (see, e.g., Japanese Patent Un-examined Application Laid-Open Nos. 58-73746, 58-159,252 and 59-159,510, or West German Patent Application Laid-Open DE-OS 3,309,483). However, it has been found that the conventional amorphous thin films, including these systems, provide a large modulation noise, because of the production of unwritable portions (inverse magnetized portions) at the centers of recording domains during recording and, therefore, an insufficient carrier-to-noise ratio (C/N) on reading.

SUMMARY OF THE INVENTION

An object of this invention is to provide an amorphous magneto-optical recording medium which provides a high reading carrier-to-noise ratio, hereinafter referred to as C/N (or S/N) and is preferably adapted to practical use.

In order to attain this object, in accordance with this invention, there is provided a magneto-optical recording medium of a rare-earth-transition metal system having an easy axis of magnetization in the direction perpendicular to the film surface, and being substantially amorphous, and having a compensation temperature, Tcomp, where saturation magnetization Ms comprised of that by rare-earth elements and that by transition metal elements is virtually zero, set at (1) 50° C. or more, or
(2) 0° C. or less.

In the case (1), Tcomp is preferably set at 80° C. or more for practical use, and preferably below 200° C., and more preferably below 150° C. for obviating difficulty of writing. The difference between Curie Temperature, Tc, where the magnetization is annihilated and Tcomp, is set within 100° C., preferably within 60° C., which also applies to the case where Tcomp is higher than Tc, so as to further improve the C/N. Tc is preferably set above 100° C., and more preferably 150° C. or more in view of thermal stability of recording information, and below 300° C., and more preferably below 250° C. in view of the limitation of laser power.

In the case (2), Tcomp is preferably set at $-50°$ C. or less for practical use Tc, as in the case (1), is preferably set at the range of 100°–150° C. or more, and at the range of 250°–300° C. or less.

The rare-earth-transition metal amorphous material satisfying the above requirements is a composition in which a rare-earth element occupies a larger part than in a compensation composition in which the rare-earth element and the transition metal element are equal to each other in their magnetization at the normal temperature and the saturation magnetization, Ms, is virtually zero (case (1)); or a composition in which the transition metal element occupies a larger part than in the compensation composition (case (2)). With respect to, e.g., the Tb-Fe-Co system, in the case (1), it may comprise Tb of 24–30%, Co of 7–20% and the remainder being substantially Fe (in atomic percent), while in the case (2), it may comprise Tb of 18–21.5%, Co of 8–10% and the remainder being substantially Fe (in atomic percent).

The principle of this invention will be explained below.

When writing is performed by using a Curie temperature, Tc, in an actual use of the amorphous perpendicular magnetized film as a magneto-optical recording material, the Curie temperature, Tc, is preferably set below 300° C., and more preferably below 250° C. in view of limitation of the semiconductor laser light power, its recording sensitivity and life time. The coercive force, Hc, is also preferably about 1 KOe or more and over in view of thermal stability of recording information. The inventors of this invention found that the compensation temperature Tcomp where the saturation magnetization, Ms, is virtually zero, as at the Curie temperature, also greatly influences the recording sensitivity, readout noise, etc. in relation to Tc. More specifically, even if Tc is 300° C. or less during the Curie temperature writing, Tcomp in the neighborhood of the room temperature doesn't permit recording domains uniform in their shape to be produced during recording, and so a high modulation noise occurs, thereby reducing C/N during readout. The reason why the recording domains uniform in their shape are not provided is the influence of the demagnetized field, and whether or not such uniform recording domains are provided greatly depends on the temperature dependance of saturation magnetization during recording. Namely, as seen from the temperature change of the saturation magnetization, Ms, of a $Tb_{22} Fe_{72} Co_6$ film as illustrated in FIG. 1, when Tcomp is in the neighborhood of the room temperature even with Tc being comparatively low, with respect to temperature, Ms has a tendency of first rising, marking a maximum value. and thereafter lowering (in FIG. 1, the vertical axis is indicated in an optional scale). Thus, the recording domains produced are ones each of a doughnut shape with a central part not written, and the modulation noise during reading is increased. This will be explained in detail below. The recording is performed, as shown in FIG. 2A, in such a way that with a minute portion 3 of an amorphous magnetic thin film 2, heated by the irradiation of laser light through a lens 1, and external field is applied to invert the magnetization direction of the minute portion 3. In this case, the laser light, as shown in FIG. 2B, has a higher strength at the central portion than the peripheral portion. Since the coercive force Hc is decreased with the temperature increased, the magnetization at the central portion is likely to be inverted in the direction reverse to the recording magnetization by the demagnetizing field generated, and the inverted magnetization at the central portion will be influenced by the field at the peripheral portion. Thus, when the saturation magnetization, Ms, is large as shown in FIG. 1 during the recording, the magnetization at the central portion is apt to be inverted because of the demagnetizing force increased, and the recording magnetic domains thus formed are ones 31 each of a doughnut shape having a central portion 30 not properly written (see FIG. 3A).

Accordingly, in order to restrain the magnetization at the central portion from being inverted in the direction reverse to the recording magnetization so as to improve the C/N, the following two (1), (2) methods will be proposed.

(1) As mentioned above, whether or not the recording magnetic domains each having a uniform shape are produced depends on the saturation magnetization, Ms, at the temperature increased by the irradiation of laser light in the recording. As a result of experiment on the basis of this knowledge, it was found that with the smaller Ms, the recording magnetic domains each have a more uniform shape, and the modulation noise during reading is greatly reduced or becomes zero. Thus, this finding taught that the saturation magnetization Ms of the recording magnetic film at room temperature is desired to be 200 emu/cc or less on more preferably 100 emu/cc or less and to have a tendency of generally decreasing with an increase in temperature. Namely, as shown in the temperature change of Ms relative to an amorphous $Tb_{25} Fe_{61} Co_{14}$ film in FIG. 4, Ms is desired to generally reduce with an increase in temperature and not to increase so greatly at the temperature over Tcomp. In this case, the recording magnetic domains each having a uniform shape are provided as shown in FIG. 3B. Ms can be decreased, as shown in the temperature change of Ms relative to an amorphous $Tb_x Fe_{82-x} Co_{18}$ film in FIG. 5, by increasing the concentration of the rare earth element, i.e., Tb, and Tcomp. It was also found as a result of the inventors' reserch that in order to provide the recording magnetic domains each having a uniform shape with Ms sufficiently decreased as mentioned above, with respect to the rare-earth-transition metal amorphous thin film having substantially the same temperature change of Ms as mentioned above, Tcomp might be 50° C. or more when the Curie temperature Tc is restricted below 300° C., and more preferably below 250° C. in view of limitation of the laser power. This will be because with Tcomp in the neighborhood of room temperature, Ms during recording becomes excessively large. Tcomp is desired to be 50° C. or more and more preferably 80° C. or more in view of the thermal stability of the recording magnetic domains written. Tcomp is also desired to be in the range of 150°–200° C. or less since when Tcomp exceeds 150°–200° C., the coercive force Hc during the recording becomes too large, thereby making the recording difficult.

In the case of using a magneto-optical material having Tcomp which is higher than 50° C. and lower than Tc, the writing is performed by using the compensation temperature, Tcomp, so that Tc may be 300° C. and over. Thus, with Tc being higher, the reduction in the Kerr rotation angle θk can also be made small by the temperature increase due to the laser light during reading.

With the difference between Tc and Tcomp being within 100° C., preferably 60° C., Ms during recording can be further decreased, thereby improving C/N. Also, in the case where Tcomp does not appear at the temperature lower than Tc, e.g., in the case of Tb concentration of 34% in FIG. 5, recording magnetic domains uniform in their shape can be provided because of decreased Ms. Moreover, the alloy film having Tcomp lower than Tc has the coercive force, Hc, having a tendency of first increasing with temperature to Tcomp and decreasing from the temperature exceeding Tcomp. Thus, since Hc is comparatively large at the normal temperature, which is a maintenance temperature of a recording medium, and the thermal stability of the recording magnetic domains written is larger with the increasing coersive force, the alloy film is very excellent also as regards the thermal stability.

(2) The second method for preventing the magnetization at the central portion from being inverted in the direction reverse to the recording magnetization so as to improve the C/N is to decrease the laser power so as to remove the temperatures between at the central and peripheral portions.

In the case of performing the recording by using the amorphous magnetic thin film containing a larger part of transition metal element than the compensation composition, the recording magnetization at the portion locally heated by the laser light and the magnetization at the peripheral portion serve so as to close the magnetic field. Therefore, even with the external field and the laser power decreased, the recording can be performed with a high sensitivity.

Thus, the amorphous magnetic thin film containing a larger part of transition metal element than the compensation composition also permits recording magnetic domains uniform in their shape to be formed with the saturation magnetization, Ms, decreased and also the laser power decreased for uniform heating.

As a result of the research by the inventors, it was found that in the case of restricting Tc to the range of 250°–300° C. or less in view of the limitation of laser power, C/N can be improved by setting Tcomp at 0° C. or less preferably −50° C. or less. Namely, MS can be made smaller in the case of limiting Tcomp to 0° C. or less than the case of placing Tcomp in the neighborhood of room temperature. The laser power is set at 1–4 mV. Thus, recording magnetic domains uniform in their shape can be provided. Moreover, uniform heating in such a way of rotating a magneto-optical disk at a high speed so as not to greatly increase the temperature of the medium also permits the recording magnetic domains uniform in their shape to be formed.

In this second method, in addition to the improvement of C/N, the recording can be carried out with a high sensitivity, and the Kerr rotation angle θk can be increased because of the abundance of the transition element in the medium.

With respect to the composition of material in the magneto-optical recording medium in the methods of (1) and (2) mentioned above, as for the rare-earth-transition metal system, the composition satisfying the temperature range in the method (1) is limited to the one containing a larger part of rare-earth element than the compensation composition while the composition satisfying the temperature range in the method (2) is limited to the one containing a larger part of transition metal element than the compensation composition. As a representative example thereof, there is shown in FIG. 6 the dependency of the Curie temperature Tc and the compensation temperature Tcomp of a Tb-Fe-Co amorphous perpendicular magnetized film ($Tb_x Fe_{100-x-y} Co_y$) on the concentration of Tb with parameters of the concentration of Co. In this figure, an arrow indicates the concentrations of Tb in the compensation composition, which slightly vary in accordance with the concentration of Co but are placed substantially in the neighborhood of an arrow as shown. Curve 1 shows Tc with y=30.4, curve 2 shows Tc with y=17.5, curve 3 shows Tc with y=11, curve 4 shows Tc with y=10.3, and curve 5 shows Tc with y=5, curve 6 shows Tcomp with y=30.4, curve 7 shows Tcomp with y=17.5, curve 8 shows Tcomp with y= , curve 9 shows Tcomp with y=10.3 and curve 10 shows Tcomp with y=5. As seen from the figure, with the increasing amount of Co, Tc is increased and the concentration of Tb where Tc and Tcomp coincide with each other moves towards the higher concentration thereof. As understood from the crossing points of the curves of Tc and Tcomp, the composition having Tcomp being in the neighborhood of Tc or higher than Tc is the one having the higher concentration of Tb (i.e., the composition containing a larger part of Tb element than the compensation composition), while the composition having Tcomp lower than room temperature is the one having lower concentration of Tb (i.e., the composition containing a larger part of transition metal element than the compensation composition).

An optimum composition of the Tb-Fe-Co amorphous perpendicular magnetized film in the method (1) should be limited, in view of the experiment results shown in FIG. 6, to a narrow composition range comprising Tb of 24–30 atomic %, which means that it contains a larger part there thereof than in the compensation composition, Co of 7–20 atomic % and the remainder being substantially Fe. This will be concretely explained below. Tb of 24 atomic % or more permits the compensation temperature Tcomp of 50° C. or more although it also depends on the concentration of Co, while Tb of 30 atomic % or less restricts Tcomp to 200° C. or less. Co of 20 atomic % and below is suitable to restrict Tc to the range of 250°–300° C. or less; however Co of 30 atomic % or so is available to increase the Kerr rotation angle although it slightly enhances Tc. Co of 7-9 atomic % as a lower limit is suitable to provide the Kerr rotation angle $\theta k$ as large as the range 0.3°–0.32° (at $\lambda=633$ nm) or more which range is important for practical use. Incidentally, the difference between Tc and Tcomp within 100° C. can be obtained, as seen from FIG. 6, by setting the concentration of Tb at the higher Tb concentration side in the above composition or that of Co at the Tb lower concentration side.

An optimum composition of the Tb-Fe-Co amorphous perpendicular magnetized film in the method (2) should be limited, in the view of the experiment results shown in FIG. 6, to a very narrow composition range comprising Tb of 18–21.5 atomic %, which means that it contains a larger part of iron family element than in the compensation composition, Co of 8–10 atomic % and the remainder being substantially Fe. This wil be concretely explained below. Tb of 21.5% as an upper limit restricts Tcomp to 0° C. or less, while Tb of 18 atomic % as a lower limit provides the sufficiently large Kerr rotation angle. Co of 10 atomic % as an upper limit is suitable to restrict Tc to 250° C. and below, while Co of 8 atomic % as a lower limit is suitable to provide the sufficiently large Kerr rotation angle for practical use. By selecting the Tb concentration at 20 atomic % or less Tcomp not more than −50° C. can be obtained notwithstanding the condition of higher Co concentration of 9 to 10 atomic %, presenting the increase of the Kerr rotation ungle $\theta k$.

The addition, in these ternary systems mentioned above, of a small amount of impurity element such as another rare-earth element, transition metal element. etc. further improves the characteristics of the magneto-optical record recording medium. The magneto-optical recording medium of rare-earth-transition metal system includes, e.g., Tb-Fe-Co, Tb-Fe, Tb-Gd-Fe, Tb-Sm-Fe, Tb-Co, Tb-Dy-Fe, Tb-Dy-Fe-Co, Tb-Gd-Fe-Co, Tb-Sm-Fe-Co, Tb-Er-Fe-Co, and Dy-Sm-Fe-Co systems.

DESCRIPTION OF THE PREFERRED EMBODIMENTS

Embodiment 1

The amorphous alloy film according to this invention was formed on an Fe disk having a diameter of 8 inches using a composite target having an area of $1 \times 1$ cm$^2$ in which a rare-earth element and a transition metal element such as Co are arranged to provide a predetermined composition in their area ratio, by means of a well-known magnetron sputtering method.

A disk for estimating recording and reproduction characteristics was made by forming a groove of UV resin for tracking on a glass disk having a diameter of 5 inches, and successively coating thereon an $SiO_2$ film about 300 Å thick, Tb-Fe-Co film about 1000 Å thick and another $SiO_2$ film about 700 Å thick.

Figure 1:
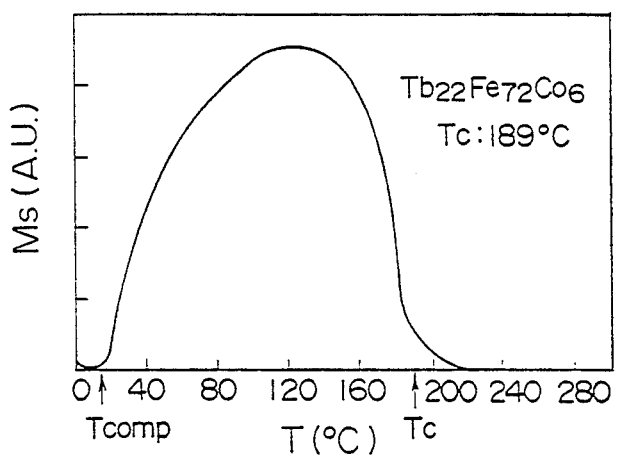
FIG. 1 is a graph showing the temperature dependency of the saturation magnetization Ms of a $Tb_{22} Fe_{72} Co_6$ amorphous thin film.
Figure 4:
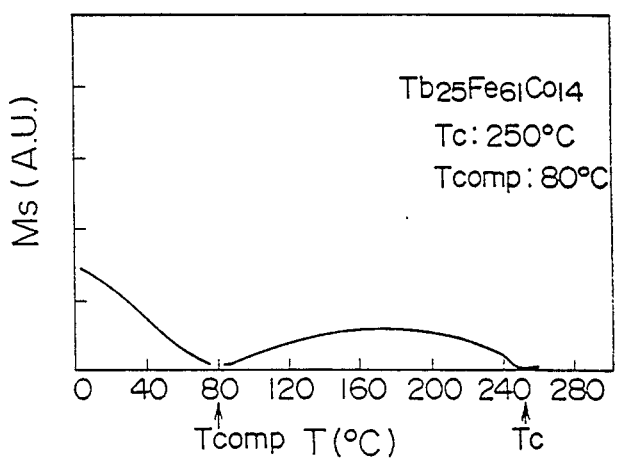
FIG. 4 shows a graph showing the temperature dependency of the saturation magnetization Ms of a $Tb_{25} Fe_{61} Co$ amorphous thin film.
Figure 2A:
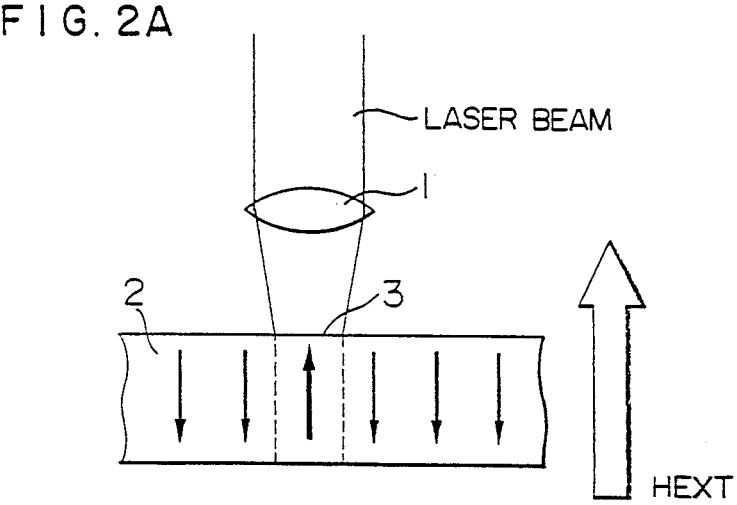
FIG. 2A is a view for explaining an example of magneto-optical recording.
Figure 2B:
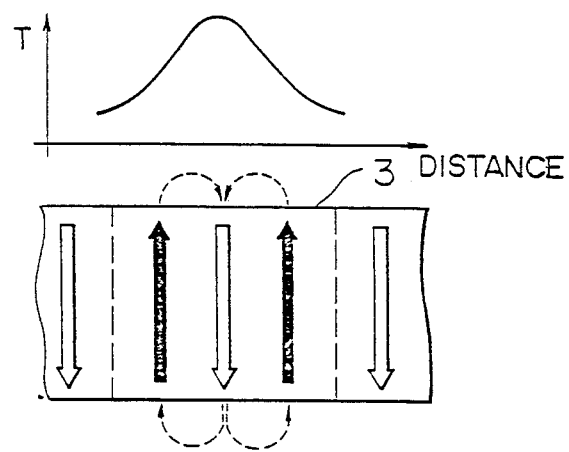
FIG. 2B is a view showing the provision of an invented magnetic domain at the central portion of a recording domain.
Figure 3A:
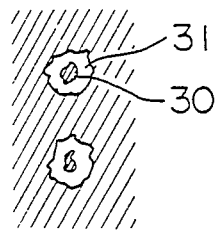
FIG. 3A shows recording domains of donut shapes not having uniform shapes.
Figure 3B:
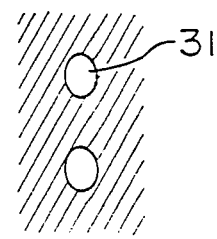
FIG. 3B shows recording domains having uniform shapes according to this invention.
Figure 5:
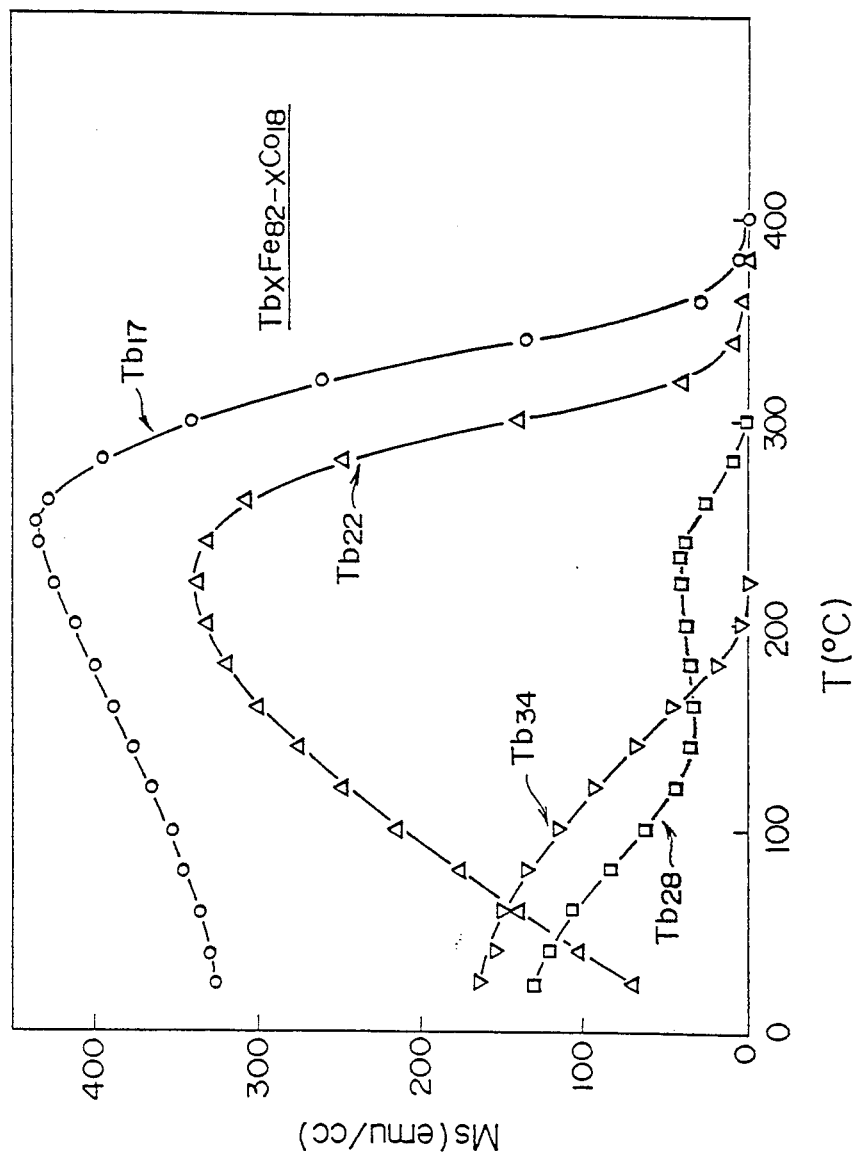
FIG. 5 shows a graph showing the Tb concentration (x) dependency of the saturation magnetization Ms of a $Tb_x Fe_{82-x} Co_{18}$.
Figure 6:
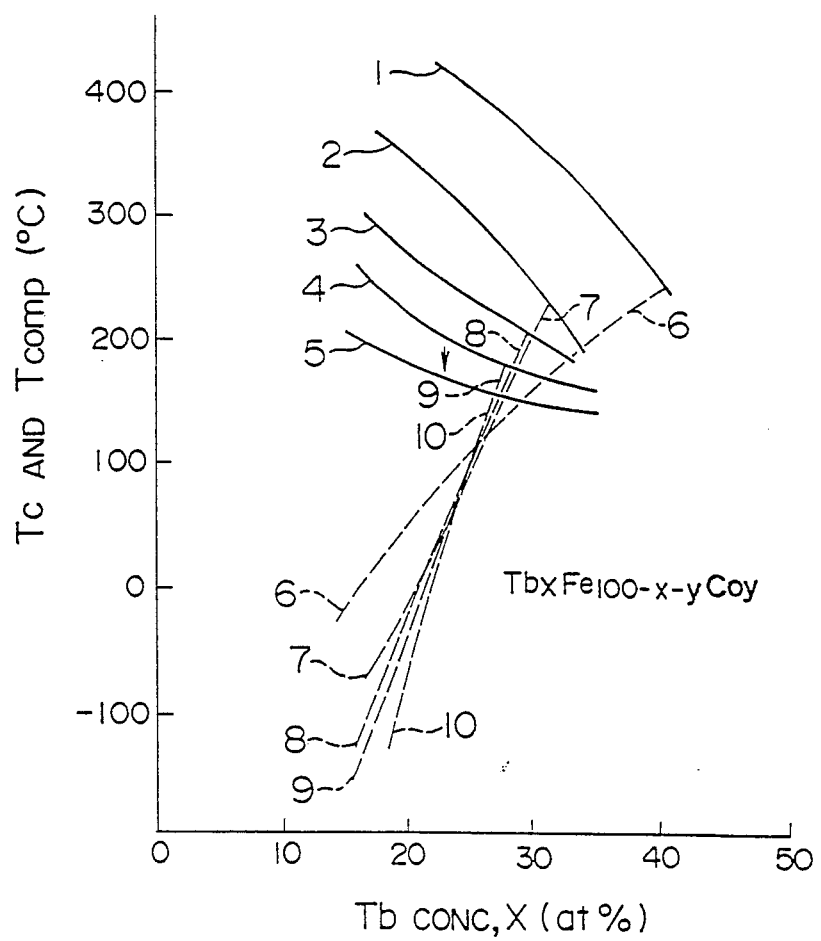
FIG. 6 shows a graph showing the dependency of the Curie temperature Tc and the compensation temperature Tcomp of a $Tb_x-Fe_{100-x-y}-Co_y$ system amorphous thin film upon the concentration (x) of Tb with parameters of the concentration (y) of Co.
Figure 7:
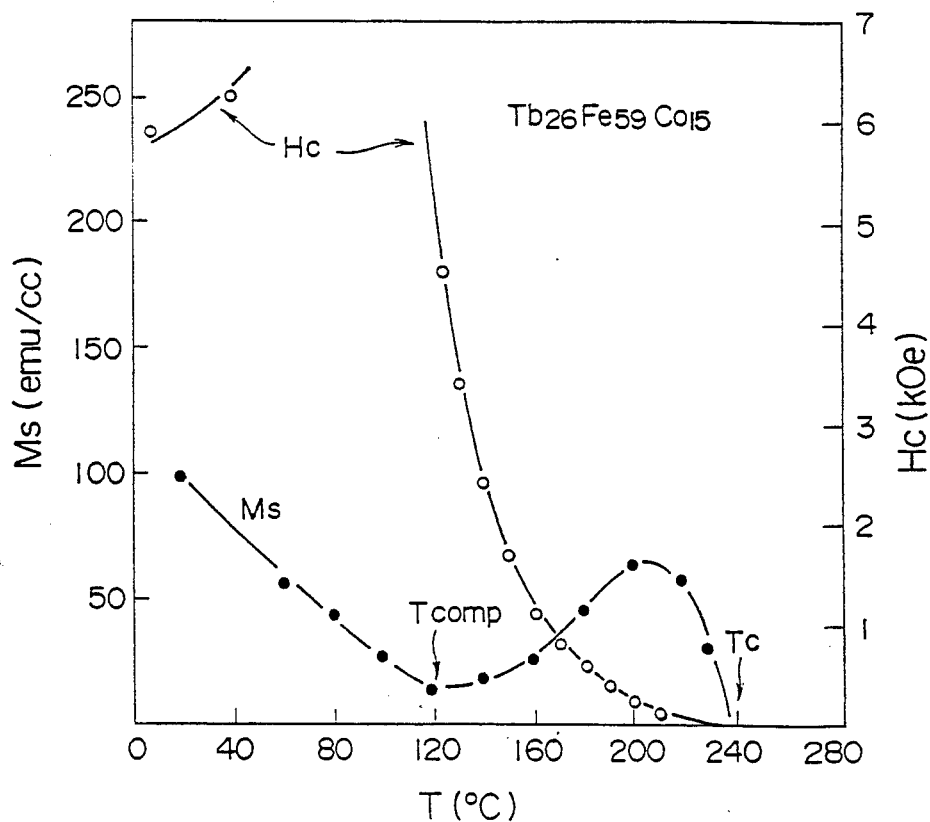
FIG. 7 shows a graph showing the temperature dependency of the saturation magnetization Ms and coersive force Hc of a $Tb_{\approx}Fe_{56} Co_{15}$ amorphous thin film.

FIG. 7 shows the temperature dependency of the saturation magnetization, Ms, and coercive fource Hc for a $Tb_{26} Fe_{59} Co_{15}$ amorphous film. Tcomp is about 120° C. figure, Ms generally decreases with an increase in temperature, and does not exceed 100 emu/cc. When writing was carried out with a laser light power of 7 mW during the recording, recording magnetic domains uniform in their shape were formed. Since the coercive force Hc at room temperature where the medium is preserved is also large, the medium according to this embodiment has an exellent thermal stability.

Embodiment 2

The magneto-optical recording medium having a $Tb_{28.2}Fe_{60.1}Co_{11.7}$ film was made in the same manner as Embodiment 1. The recording magnetic domains was observed with a disk rotation speed of 1800 rpm and with a recording laser light power of 4–10 mW changed. Then any area with the magnetization inverted was not observed at the center of the recording magnetic domain, but the recording magnetic domains uniform in their shape were observed. For comparison therewith, the observation of the recording magnetic domains was performed for the one using $Tb_{22.6}Fe_{67.9}Co_{9.5}$ amorphous film. Then, the recording magnetic domains uniform in their shape were partially observed with the laser light power as low as about 4 mW, but the other areas with the magnetization inverted at the centers of the magnetic domains were observed in general.

Embodiment 3

The amorphous perpendicular magnetized film having a composition of $Tb_{25}Fe_{61}Co_{14}$, $Tb_{26}Fe_{57}Co_{17}$, $Tb_{29}Fe_{48}Co_{19}$, etc. was provided as a recording film in the same manner as Embodiment 1. This film has properties such as Tc=240°–270° C., Tcomp=80°–200° C., Hc=1–14 KOe, Ms=80–160 emu/cc and $\theta k=0.33°–0.35°$.

A 5" $\phi$ multi-layer disk was provided by using these amorphous perpendicular magnetized film in the same manner as Embodiment 1. In the estimation of reading, the disk rotation speed was fixed at 1200 rpm. With the recording laser light power of 7–8 mW, the recording magnetic domains having uniform shapes, and so without the modulation noise during reading, were provided by the application of an external magnetic field Hex of 200 Oe and over. The recording information read out with the reading laser light power of 1–2 mW gave a readout C/N ratio at high as 52–55 dB (measurement frequency f~1 MHz).

In the third embodiment, a Tb-Fe-Co system was used as a typical example of the rare-earth-transition metal system for magneto-optical recording medium, but the other rare-earth-transition metal systems as mentioned above also provide the same effect.

Moreover, in accordance with this embodiment, a high C/N can be obtained without virtually enhancing the Kerr rotation angle through the multiple reflection in an interference structure. The interference multi-layer film disk comprising one of the amorphous films of third embodiment and an interference film of ZnS, AlN, $Si_3N_4$, BN, $Ta_2O_3$, SiO, etc. which have a comparatively high refractive index provides a further higher C/N of 57 dB or more.

Embodiment 4

A disk for estimating the characteristics during recording and reading was made by forming a groove of UV resin for tracking on a glass disk of 5"$\phi$, and successively coating thereon a Tb-Fe-Co film about 1000 Å thick, and an $SiO_2$ film about 700 Å. The amorphous perpendicular magnetized film having a composition of $Tb_{26}Fe_{62}Co_{12}$, $Tb_{28}Fe_{59}Co_{13}$, $Tb_{28.5}Fe_{60.5}Co_{11}$, etc. was provided as a recording film with the difference between Tc and Tcomp within 100° C. This film has film properties such as Tc=180°–230° C., Tcomp≧180° C., Hc=1–8 KOe, Ms=100–190 emu/cc, and $\theta k (\lambda=633$ nm)=0.3°–0.35°. The above 5"$\phi$ multi-layer disk was provided using this film of the third embodiment. In the estimation of the characteristics during recording and reading, the disk rotation speed was fixed at 1200 rpm. With the recording laser light power of 5–9 mW, the application of the external field of 800 Oe or more during the recording provides no modulation noise during the reproduction. In this condition, C/N of 51–54 dB was provided. The interference multi-layer film disk comprising one of the amorphous films mentioned above and an interference film of ZnS, AlN, $Si_3N_4$, BN, SiO, etc. which have a comparatively high refractive index provides a further higher C/N of 56 dB or more.

Embodiment 5

A disk for estimating recording and reading characteristics was made by forming a groove of UV resin for tracking on a glass disk of 5"$\phi$, and successively coating thereon a Tb-Fe-Co film about 1000 Å thick, and an $SiO_2$ film about 700 Å. The amorphous perpendicular magnetized film having a composition of $Tb_{21.5}Fe_{17.5}Co_7$ as a typical examples of the composition containing a larger part of iron group element than in the compensation composition, was provided as a recording film. This film has properties such as Tc=190°–230° C., Tcomp≦−50° C., Hc=1–3 KOe, Ms=120–195 emu/cc, and $\theta k$ (at $\lambda=633$ nm)=0.31°–0.35°. The above 5" $\phi$ multi-layer disk was provided using this film. In the estimation of recording and reading characteristics, the disk rotation speed was fixed at 1800 rpm. With the recording laser light power of 3 mV and the readout laser light power of 1 mV, the application of the external field of 200 Oe or more during the recording provides no modulation noise during the reproduction. The recording of information on the above film by the application of the external field of 300 Oe leads to a reading output-to-noise ratio C/N as high as 52–55 dB (at 1 kHz, bandwidth $\Delta f=30k$ Hz, track pitch=1.6 $\mu m$).

In this embodiment, a Tb-Fe-Co system was used as a typical example of the rare-earth-transition metal system for magneto-optical recording medium, but the other rare-earth-transition metal systems as mentioned above also show the same effect.

As understood from this embodiment, the amorphous perpendicular magnetized film provides a modulation noise substantially equal to zero, and a high C/N without virtually enhancing the Kerr rotation angle through the multiple reflection in an interference structure. Further, the interference multi-layer film disk comprising one of the amorphous films as mentioned above and an interference films of ZnS, AlN, $Si_3N_4$, BN, SiO, etc. which have a comparatively high refraction index provides a further higher C/N of 56 dB or more.

We claim:

1. A magneto-optical recording medium comprising an amorphous perpendicular magnetized film having an easy axis of magnetization in a direction perpendicular to the film surface, comprising 24–30 atomic % Tb, 7–20 atomic % Co, and the remainder being substantially Fe and having a Curie temperature of 250° C. or less and a magnetic compensation temperature of 50° C. or more.

2. A magneto-optical recording medium according to claim 1, wherein said amorphous perpendicular magnetized film has a magnetic compensation temperature of 80° C. or more.

3. A magneto-optical recording medium according to claim 1, wherein said amorphous perpendicular magnetized film has a Curie temperature greater than 100° C.

4. A magneto-optical recording medium according to claim 1, wherein said amorphous perpendicular magnetized film has a Curie temperature greater than 150° C.

5. A magneto-optical recording medium according to claim 1, wherein said amorphous perpendicular magnetized film has a Curie temperature and a magnetic compensation temperature such that a difference between said Curie temperature and said magnetic compensation temperature is within 100° C.

6. A magneto-optical recording medium according to claim 1, wherein said amorphous perpendicular magnetized film has a Curie temperature and a magnetic compensation temperature such that a difference between said Curie temperature and said magnetic compensation temperature is within 60° C.

* * * * *